July 11, 1950
F. E. McGOVERN
2,514,780
WIPING MECHANISM FOR CONVEYER BELTS
Filed Feb. 19, 1949
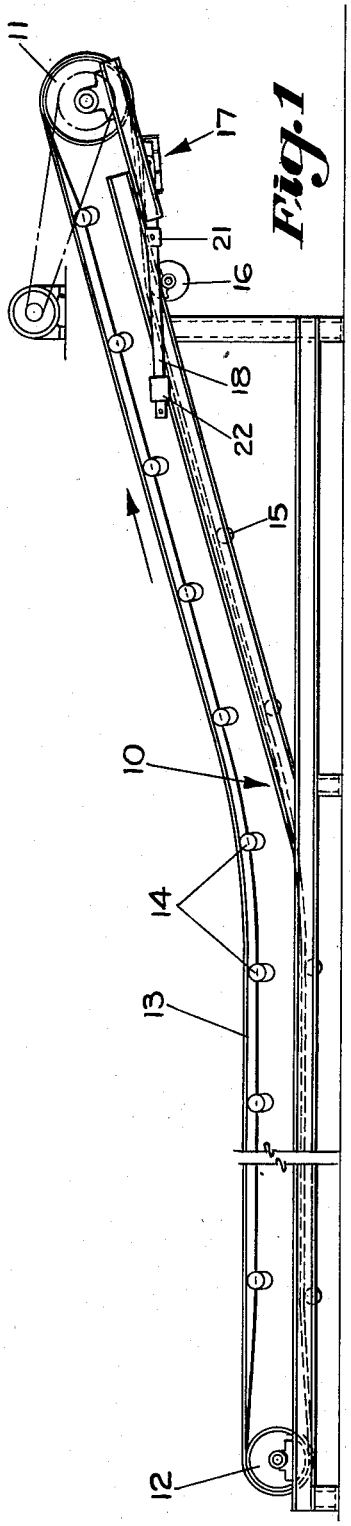
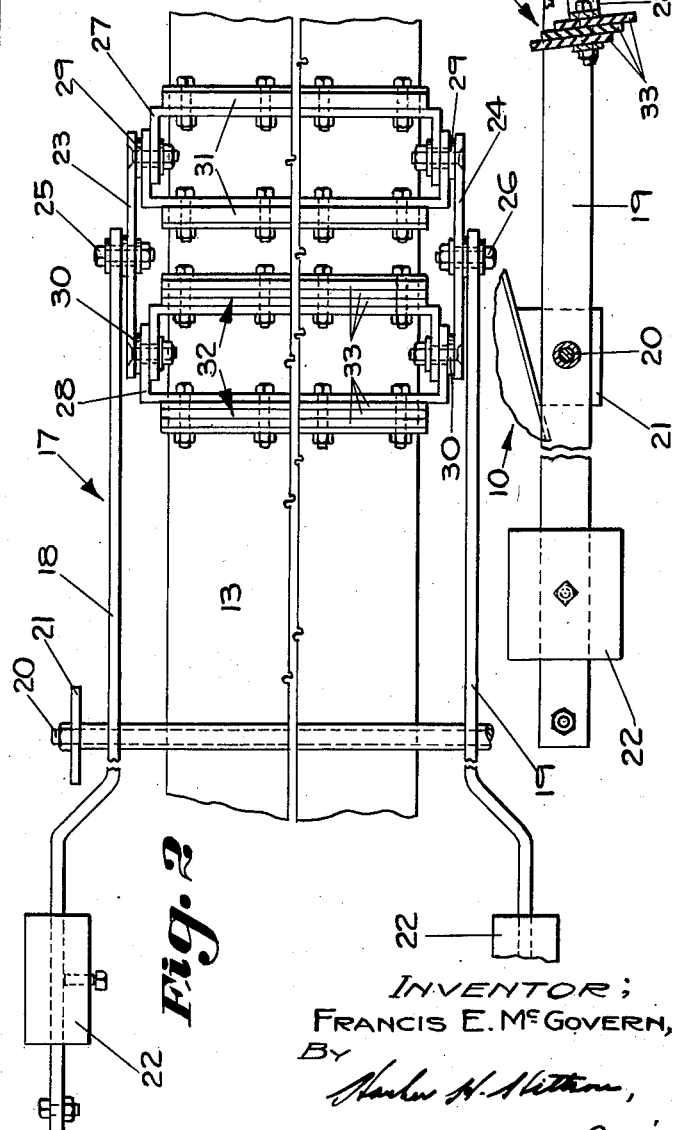
INVENTOR;
FRANCIS E. McGOVERN,
BY
ATT'Y.

Patented July 11, 1950

2,514,780

UNITED STATES PATENT OFFICE 2,514,780

WIPING MECHANISM FOR CONVEYER BELTS

Francis E. McGovern, Columbus, Ohio, assignor to The Jeffrey Manufacturing Company, a corporation of Ohio Application February 19, 1949, Serial No. 77,365

4 Claims. (Cl. 198—230)

This invention relates to belt wiping mechanism, and an object of the invention is to provide such mechanism which is designed to wipe sticky material, such as dirt and the like, from the return run of a conveyer belt; the wiping mechanism including one or more flexible wipers which have direct contact with the load carrying surface of the belt, the wipers preferably being stepped or tapered from the front to the rear, and in one specific form of the invention being laminated and built of a plurality of similar independent strips of molded rubber, or the like.

A further object of the invention is to provide such belt wiping mechanism and support it on balanced cradle means so that there will be at least two spaced apart wipers carried by the mechanism and in contact with the belt surface.

As a further development of the above object it is a further object to provide such an arrangement in which the pivoted cradle can merely be reversed to provide new and different wiping edges of the wipers for the belt.

Other objects of the invention will appear hereinafter, the novel features and combinations being set forth in the appended claims.

In the accompanying drawings,

Fig. 1 is a side elevational view of a belt conveyer incorporating the wiper of my invention;

Fig. 2 is an enlarged plan view showing one form of the wiper mechanism;

Fig. 3 is a side elevational and sectional view of said wiper mechanism; and

Fig. 4 is a sectional view showing a modified form of wiper.

The conveyer includes a main frame 10 having a power driven head pulley 11 and a tail pulley 12, between which the endless conveyer belt 13 extends. The upper run of the conveyer belt 13 may be supported on a plurality of troughing idlers 14, or the like, the return run being supported on return idlers 15. There is also a main belt guiding snub pulley 16 to the rear of the head pulley. Obviously, the upper run of the belt 13 may be either flat or troughed, as dictated by the form of the idlers 14.

Associated with the return run of the belt 13 and preferably located just to the rear of the head pulley 11 so as to wipe the load carrying surface of the belt 13 there is a wiper mechanism designated as a whole by reference character 17. The function of the wiper mechanism 17 is, of course, to wipe dirt and other foreign matter from the load carrying surface of the belt 13 which will be the upper surface during the working run and the lower surface during the return run thereof.

The wiper mechanism 17 includes a wiper frame which is built of a pair of parallel pivoted arms 18 and 19 pivotally attached intermediate their ends to a transverse pivot rod 20 carried on brackets 21 attached to the main frame 10. The rearwardly extending portions of the arms 18 and 19 carry counterweights 22 which counterbalance the equalized wiper cradles of the quadruple wiper described in detail hereinafter.

The quadruple wiper includes an essentially balanced mechanism including an opposed pair of arms 23 and 24 which are pivoted at their centers on a common transverse horizontal axis relative to the forward free ends of the arms 18 and 19 by pivot mechanisms 25 and 26, respectively. At the opposite ends of each of the arms 23 and 24 there is a balanced pivoted cradle, the forward cradle being designated 27 and the rearward cradle 28.

Cradles 27 and 28 are of similar construction and include a pair of overlapping U-shaped plates or straps which are rigidly attached together. The cradles 27 and 28 are pivotally attached to the opposite ends of the arms 23 and 24 by pivot mechanisms 29 and 30, respectively, so that they are substantially balanced on said axis. Each of the cradles 27 and 28 includes forward and rearward parallel transverse wiper supports which constitute the principal parts of said cradles and which receivably support flexible wipers.

As illustrated in Figs. 2 and 3 of the drawings, the two wipers mounted on the forward cradle 27 are relatively thick and formed of a single sheet of relatively heavy flexible material, such as molded rubber, and these wipers are designated 31. The cradle 28 similarly supports a pair of wipers designated 32, the structure of which wipers is of particular significance.

Each of said wipers 32 is formed of a plurality of independent rectangular strips 33 of flexible material, such as molded rubber, said strips 33 preferably being of the same dimensions. The strips 33 are, however, formed in offset relation relative to a horizontal plane, or relative to the adjacent surface of the belt 13 which is to be contacted, so that the belt 13 in traveling over them, as illustrated in Fig. 3 of the drawings, will first be contacted by the lowermost of the strips 33, then by the intermediate height strip 33, and finally by the highest strip 33. In other words, the height of each strip, as measured from a plane parallel with the plane of the belt 13, progressively increases from the front to the rear, thus forming a stepped relation or a tapered relation which increases from the front to the rear. It has been found in practice that this makes for a very efficient wiper, and the various wiping strips 33 take the general disfiguration when in operation as illustrated by the forward wiper 32 in Fig. 3 of the drawings.

As illustrated in the drawings, the single strip wipers 31 have approximately the same height as the forward wiper strip 33 carried by the cradle 28. If desired, the plural strip stepped wipers 32 may be substituted for the wipers 31.

It is also to be noted that it is a very simple matter to provide new wiping surfaces of the wipers 32 in association with the surface of the belt 13 to be cleaned. To this end it is merely necessary to lower the quadruple wipers away from the surface of the belt 13 and to rotate the cradles 180°. The same stepped relation of the wipers 32 will be preserved, but the opposite wiping surfaces of the strips 33 will be utilized.

In Fig. 4 of the drawings there is illustrated a modified form of stepped wiper which is designated 34, which may be substituted for the wipers 31 or 32. The wiper 34 is made of a single piece of flexible material, such as molded rubber, but is stepped on opposite sides to provide double wiping surfaces similar to that provided by wipers 32.

It may also be mentioned that in a broad sense n either of the forms of the wipers 32 or 34 they constitute a tapering relation, in that the forward edge of each wiper is lower than its rearward edge when compared with the direction of travel of the belt 13 with which it is associated.

The construction of these wipers is therefore such that in operation the tendency will be for the trailing portion of the wiper 32 or 34, as the case may be, to be deflected downwardly and rearwardly relative to the belt 13 with which it has wiping contact and thus have contact over an extended area of the belt 13.

Furthermore, the stepped construction provided has been found very efficient and this is believed to be due to the fact that there are a plurality of immediate successive edges which wipe the belt surface, since it is obvious that there will be some rearward deflection of all of the wiper strips 33 which will tend to cause their upper forward individual edges to wipe the adjacent belt surface. The wiper, constructed with the individual strips 33, at this time appears to be the preferred form because of the flexibility of the individual strips.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. Belt wiper mechanism including a frame comprising a pair of laterally spaced arms adapted to run parallel to a conveyor belt, means pivotally supporting said arms intermediate their ends on a horizontal axis, quadruple wipers pivotally mounted adjacent one end of said arms and extending between them, counterbalancing weight means on said frame, said quadruple wipers including four transversely extending bars rigidly attached together in spaced relation in pairs, each pair constituting a balanced cradle, means pivotally attaching each cradle on a transverse axis between the bars thereof to opposite ends of pivot arm means, and means pivotally attaching said pivot arm means to said frame on a transverse axis intermediate each cradle, each of said arms carrying flexible wiper strip means adapted to have wiping contact with a conveyor belt, at least one of said wiper strip means including a plurality of independent strips normally of different heights.

2. Belt wiper mechanism including a frame comprising a pair of laterally spaced arms, quadruple wipers pivotally mounted on said arms and extending between them, said quadruple wipers including four transversely extending bars rigidly attached together in spaced relation in pairs, each pair constituting a balanced cradle, means pivotally attaching each cradle on a transverse axis between the bars thereof to opposite ends of pivot arm means, and means pivotally attaching said pivot arm means to said frame on a transverse axis intermediate each cradle, each of said arms carrying flexible wiper strip means adapted to have wiping contact with a conveyor belt, at least one of said wiper strip means including a plurality of independent strips normally of different heights.

3. Belt wiper mechanism including a frame comprising a pair of laterally spaced arms, quadruple wipers pivotally mounted on said arms and extending between them, said quadruple wipers including four transversely extending bars rigidly attached together in spaced relation in pairs, each pair constituting a balanced cradle, means pivotally attaching each cradle on a transverse axis between the bars thereof to opposite ends of pivot arm means, and means pivotally attaching said pivot arm means to said frame on a transverse axis intermediate each cradle, each of said arms carrying flexible wiper strip means adapted to have wiping contact with a conveyor belt.

4. Belt wiper mechanism including a frame comprising a pair of laterally spaced arms adapted to run parallel to a conveyor belt, means pivotally supporting said arms intermediate their ends on a horizontal axis, quadruple wipers pivotally mounted adjacent one end of said arms and extending between them, counterbalancing weight means on said frame, said quadruple wipers including four transversely extending bars rigidly attached together in spaced relation in pairs, each pair constituting a balanced cradle, means pivotally attaching each cradle on a transverse axis between the bars thereof to opposite ends of pivot arm means, and means pivotally attaching said pivot arm means to said frame on a transverse axis intermediate each cradle, each of said arms carrying flexible wiper strip means adapted to have wiping contact with a conveyor belt.

FRANCIS E. McGOVERN.

REFERENCES CITED

The following references are of record in the file of this patent:

UNITED STATES PATENTS

| Number | Name | Date |
|---|---|---|
| 674,962 | Cumming | May 28, 1901 |
| 1,117,895 | Osaka | Nov. 17, 1914 |
| 1,351,862 | Menkhaus | Sept. 7, 1920 |
| 1,375,682 | Dennis | Apr. 26, 1921 |
| 1,857,808 | Diederichs | May 10, 1932 |

FOREIGN PATENTS

| Number | Country | Date |
|---|---|---|
| 509,311 | Great Britain | July 13, 1939 |
| 517,745 | Great Britain | Feb. 7, 1940 |